Patented June 11, 1935

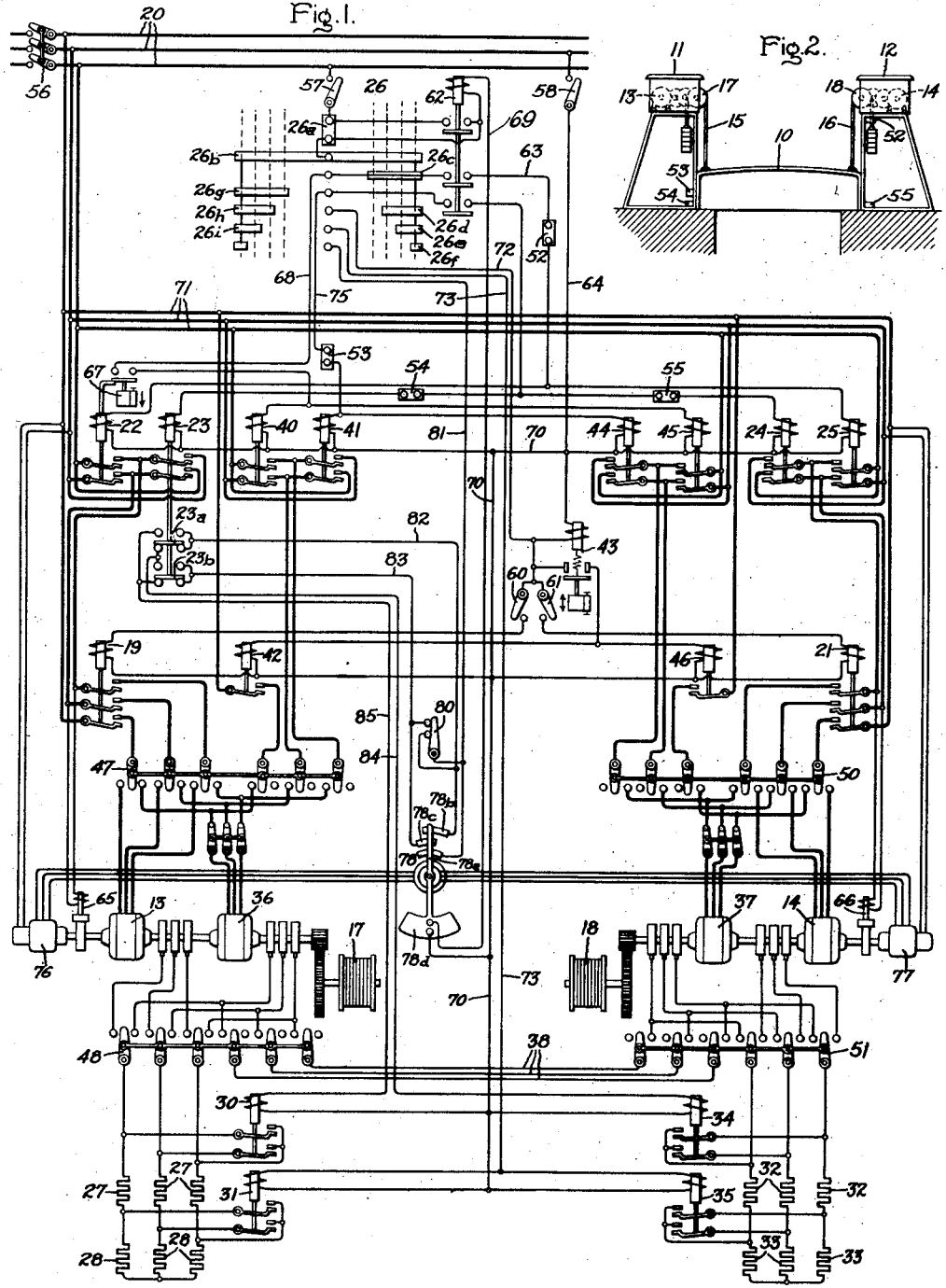

2,004,770

UNITED STATES PATENT OFFICE 2,004,770

BRIDGE CONTROL SYSTEM

Joseph A. Setter, Schenectady, N. Y., assignor to General Electric Company, a corporation of New York Application May 11, 1933, Serial No. 670,476

11 Claims. (Cl. 172—293)

This invention relates to bridge control systems, more particularly to systems for controlling the raising and lowering of the spans of lift bridges and the like, and it has for an object the provision of a simple, reliable, flexible, and improved system of this character.

More specifically the invention relates to systems in which a separate driving motor is provided at each end of the bridge span and in which no mechanical connections are provided between the driving motors, and another object of the invention is the provision of means for preventing the bridge span from becoming out of level during the raising and lowering operations.

In carrying the invention into effect in one form thereof, each end of the bridge span is driven by its individual driving motor, and these driving motors are maintained in synchronism with each other by means of a pair of electrically balanced polyphase wound rotor alternating current motors, each coupled to a respective driving motor and having their secondary windings connected together to provide the necessary interchange of power for synchronization. It has been determined that if polyphase power is applied to the primary windings of the synchronizing motors with the rotors a substantial amount out of phase electrically, the synchronizing motors may come up to speed as driving motors and may never become synchronized. This condition is of course undesirable because the desired synchronization is not obtained.

Accordingly a further object of this invention is the provision of means for effecting initial synchronization of the synchronizing motors. This is accomplished by initially applying single phase power to the primary windings of the synchronizing motors until the rotors become locked in step and thereafter polyphase power is applied to the primary windings.

Other objects will become manifest from a reading of the specification.

In illustrating the invention in one form thereof, it is shown as embodied in a system for operating the span of a lift-type traffic bridge. For a better and more complete understanding of the invention reference should now be had to the following specification and to the accompanying drawing in which Fig. 1 is a simple diagrammatical representation of an embodiment of the invention and Fig. 2 is a simple diagrammatical representation of a bridge span and operating towers illustrating an application of the invention.

Referring now to the drawing, a bridge span 10 or the like is raised and lowered in operating towers 11 and 12 by a suitable driving means illustrated as alternating current motors 13 and 14 of the wound rotor induction type, to the drive shafts of which the opposite ends of the span 10 are mechanically connected as by cables 15 and 16, and winding drums 17 and 18. The motors 13 and 14 are supplied with power from any suitable source, such, for example, as represented by the three supply lines 20 to which the primary windings of these motors are arranged to be connected by means of line contactors 19 and 21 and reversing contactors 22, 23 and 24, 25, respectively, under the control of a suitable manually operated master switch 26.

Resistances 27 and 28, respectively, under the control of accelerating contactors 30 and 31, serve to accelerate the motor 13 from rest to full speed and similarly resistances 32 and 33, respectively, under the control of accelerating contactors 34 and 35 serve to accelerate the driving motor 14 to full speed. Since the driving motors 13 and 14 are respectively located in the towers 11, 12 at the opposite ends of the bridge span, it is necessary that these driving motors should be synchronized in order to prevent the span 10 from becoming out of level and jamming in the guides during the raising and lowering operations. For this purpose, synchronizing motors 36 and 37 are respectively connected to the drive shafts of the main driving motors 13, 14.

The synchronizing motors 36 and 37 are illustrated as polyphase wound rotor induction motors having their primary windings connected to a suitable polyphase source such as the source 20 and having their secondary windings connected together by means of conductors 38. The primary windings of the synchronizing motors 36 and 37 are connected to the supply source for a phase rotation such that the direction of rotation of the rotating magnetic fields due to the stator windings is opposite to the direction in which the rotors are driven by the driving motors 13, 14. If the rotors of these synchronizing motors are out of phase with each other electrically, circulating currents are set up in their rotor windings and the connections 38 provide the interchange of power by means of which the synchronizing motors are maintained in synchronism in a well understood manner.

For the purpose of effecting initial synchronization of the synchronizing motors 36 and 37 one or the other of the contactors 40, 41 serves to apply single phase power to the primary winding of the synchronizing motor 36 and a contactor 42 serves to complete the connections of all phases of the synchronizing motor to the power source an interval of time after the single phase energization of the synchronizing motor. This time interval is determined by the setting of the time element device 43. Similarly contactors 44 and 45 serve to apply single phase power to synchronizing motor 37 and contactor 46 completes the polyphase power connections upon completion of the timing operation of time element device 43.

A suitable switching device 47, illustrated as a manually operated switch, serves partially to complete connections from the primary windings of the main driving motor 13 and the synchronizing motor 36 to the supply source 20 and when operated to its right hand position this switch serves to disconnect the motor 13 from the source and partially to complete connections from the primary winding of the synchronizing motor 36 to the source. A similar switching device 48 serves when operated to its left-hand position to connect the accelerating resistances 27 and 28 in the rotor circuit of the driving motor 13 and also serves to connect the rotor windings of the synchronizing motor 36 to the conductors 38 leading to the rotor windings of the synchronizing motor 37. When this switching device 48 is operated to its right-hand position, it serves to disconnect the accelerating resistances 27 and 28 from the rotor circuit of the driving motor 13 and also to disconnect the rotor circuit of the synchronizing motor 36 from the connections 38 as well as to connect the resistances 27 and 28 in the rotor circuit of the synchronizing motor. It will be understood that the switching devices 47 and 48 are preferably operated together and to this end suitable mechanical or electrical interlocks may be provided to insure that both are simultaneously operated to their left-hand or to their right-hand positions. Thus it will be seen that when the switches 47 and 48 are operated to their left-hand positions, the motor 13 is connected to act as a driving motor and the motor 36 is connected to act as a synchronizing motor whilst if the driving motor 13 should become disabled operation of these switches to their right-hand positions renders the driving motor 13 inactive and connects the synchronizing motor 36 for operation as a driving motor. Similar switching devices 50 and 51 perform similar functions with respect to the driving motor 14 and the synchronizing motor 37.

Suitable limit switch mechanism 52 serves to disconnect the driving motors 13 and 14 from the supply source when the bridge span 10 reaches the top limit of its travel. Due to cable stretch, a slight difference in the levels of the bridge supports, backlash in gears, or other conditions, it is desirable when seating the bridge to seat each end separately. For this purpose limit switch 53 located so as to be operated when the bridge span reaches its nearly closed position serves to remove power from the synchronizing motors 36 and 37, and limit switches 54 and 55 on opposite sides of the bridge span are arranged in such a position as to be operated and remove power from the driving motor when the end of the span with which they are associated is fully seated.

With the above understanding of the elements, apparatus and their organization in the completed system, the operation of the system itself will be readily understood from the following detailed description:

To place the system in condition for operation, the switches 56, 57, 58, 60 and 61 are operated to their closed positions. Assuming that normal operation is desired, i. e., motors 13 and 14 are to operate as driving motors and the motors 36 and 37 to operate as synchronizing motors the switches 47 and 48 are operated to their left-hand positions and the switches 50 and 51 are operated to their right-hand positions. Operation of the switches 57 and 58 to their closed positions completes an energizing circuit for the operating coil of under-voltage relay 62. This circuit is traced from the lower supply line 20 through switch 57, contact member 26$_a$ of the drum controller 26 in the neutral position thereof, operating coil of undervoltage relay 62, conductor 69, through switch contacts 78$_d$, conductors 70 and 64 and thence through switch 58 to the middle supply line. The undervoltage relay 62 is operated to its upper closed position in response to the energization of its operating coil and its upper auxiliary contact completes a holding circuit independent of the contact 26$_a$. The intermediate and lower contacts of the undervoltage relay 62 partially complete energizing circuits for the operating coils of the directional contactors 22, 23, 24 and 25.

Assuming that the bridge span 10 is in its closed position and that it is desired to open the span, the drum controller 26 is operated to its first right-hand position. In this position of the drum switch, usually known as the "drift" point, energizing circuits are completed for the operating coils of directional contactors 22 and 25 which circuits are traced from the lower supply line 20 through switch 57, upper contacts of undervoltage relay 62, power segment 26$_b$, segment 26$_c$, cooperating finger of controller, conductor 63, top limit switch 52, operating coils of contactors 22 and 25 in parallel, and thence by conductors 70 and 64 and switch 58 to the middle supply line. Contactors 22 and 25 are closed in response to energization and complete energizing circuits for the operating coils of solenoid brakes 65 and 66 respectively, thereby releasing these brakes against the tension of their operating springs (not shown), thus allowing the motor shafts to be free to rotate. Contactor 22 in closing causes the movable contact of time delay device 67 to instantly engage with its cooperating stationary contacts thereby completing energizing circuits for the operating coils of contactors 40 and 45 which circuits are traced from the lower supply line 20 to the power segment 26$_b$ as before, segment 26$_c$, conductor 68, contact of time delay device 67, operating coils of contactors 40 and 45 in parallel, and thence by conductors 70 and 64 and switch 58 to the middle supply line 20. Contactor 40 in its closed position connects one phase of the synchronizing motor 36 to the lower and middle conductors 71 which in turn are connected to the lower and middle supply line 20. Similarly contactor 45 in its closed position applies single phase power to the synchronizing motor 37. If three phase power is applied to the stator windings of the synchronizing motor instead of single phase power, and if the rotors are a substantial number of electrical degrees out of phase, the rotors will rotate to try to lock in step but due to the rotating field effect and the inertia of the rotors they are likely to pass their locked-in position, seek the next pole position, and consequently come up to speed and operate as driving motors.

Due to the manner in which the synchronizing motors are geared to the drive, there is a possibility that they may come up to speed as induction motors in the opposite direction with respect to the main driving motors and will try to raise the bridge while the main driving motors will try to lower it. This, of course, is undesirable because the two rotors should be locked in step before the equipment is actually started.

Operation of the drum controller 26 to its second position (hoisting) completes energizing circuits for the energizing coils of line contactors 19 and 21, which circuits are traced from the power segment 26b to segment 26d and cooperating finger and thence by conductor 72, switches 60 and 61 in parallel, operating coils of contactors 19 and 21 in parallel and thence by conductors 70 and 64 to the middle supply line 20. In responding to the energization of their operating coils, contactors 19 and 21 operate to their closed positions and connect the driving motors 13 and 14 to the supply lines 20 through connections that are obvious on the drawing and require no tracing. Since the full amounts of the accelerating resistances are included in the secondary circuits, the driving motors 13 and 14 begin rotating at low speed to raise the bridge span 10.

Simultaneously, the operating coil of time delay relay 43 is energized over a circuit that is traced to the conductor 72 as before and thence by conductor 64 and switch 58 to the middle supply line 20. After an interval of time determined by its setting, time delay device 43 closes its contact and completes the energizing circuit for the operating coils of contactors 42 and 46. These circuits are traced to the conductor 72 as before, thence through the contacts of time delay device 43, operating coils of contactors 42 and 46 in parallel and thence by conductors 70 and 64 and switch 58 to the middle supply line 20. Contactors 42 and 46 close in response to energization completing the polyphase connections from the supply source 20 to the synchronizing motors 36 and 37 and thereby applying full three-phase power to these motors. The synchronizing motors are now able to exert full torque and thus maintain the driving motors 13 and 14 in synchronism with each other as the span 10 is being raised.

It will be observed that the time delay device 43 prevents sudden application of three-phase synchronizing power to the synchronizing motors in the event that the manually operated drum controller is quickly thrown from its central to its final full operating speed position, which is the manner in which bridge operators usually effect this operation. The synchronizing motors are thus provided an opportunity of being locked in step by the application of single phase power prior to the application of the three-phase power and the starting of the equipment.

In the third position of the controller 26, energizing circuits are completed for the operating coils of accelerating contactors 31 and 35. These circuits are traced from the power segments 26b to the segment 26e and cooperating finger, thence by conductor 73 through the operating coils of contactors 31 and 35 in parallel and thence by conductors 70 and 64 and switch 58 to the middle supply line 20. Contactors 31 and 35 in closing exclude resistances 28 and 33 from the secondary circuits of driving motors 13 and 14, as a result of which the speed of these driving motors is increased.

On the fourth point of the controller, the accelerating contactors 30 and 34 are closed and the resistances 27 and 32 are excluded from the circuits of motors 13 and 14 respectively and as a result the speed of these motors is increased to full speed. The energizing circuits for contactors 30 and 34 are traced from the power segment 26b to segment 26f and its cooperating finger, conductor 81, contacts of switch 78 and then in parallel to conductors 82 and 83, contacts 23a and 23b, conductors 84 and 85, coils of contactors 30 and 34, and thence by conductors 70 and 64 to lower supply line 20. Although for the sake of simplicity but two steps for excluding the accelerating resistances are illustrated it will of course be understood that as many steps as desired may be provided and that in practice more than two steps are usually provided.

The bridge span 10 is now being raised at full speed and this operation continues until the bridge span 10 approaches its fully open position in which the top limit switch 52 is operated to its open position. Reversing contactors 22 and 25 are deenergized as a result of the opening of the limit switch 52 and these contactors are operated to their open position in which the driving motors 13 and 14 are disconnected from the source 20. The opening of these reversing contactors also deenergizes the brake solenoids 65 and 66 and the brakes are set by their spring operating mechanisms.

After an interval of time determined by the setting of time element device 67, the contacts of the latter device are opened and contactors 40 and 45 (the energizing circuits of which were previously traced through contacts of time delay device 67) are deenergized and opened thereby disconnecting the synchronizing motors from the source 20 and thereby removing synchronizing power from these motors. The setting of the time element device 67 is so adjusted that its contacts remain closed until the bridge span 10 has had sufficient time to come to rest and the brakes 65 and 66 have had sufficient time to set. Single phase synchronizing power is thus maintained until the brakes have set. Indicating lights (not shown) indicate that the bridge is fully open. The operator returns the manually operated controller 26 to its central position and the system is restored to its initial deenergized condition.

To lower the span the controller 26 is operated to its first lowering (left-hand) position in which energizing circuits are completed for the operating coils of reversing contactors 23 and 24. These circuits are similar to those previously traced for contactors 22 and 25 with the exception that they are completed through the left-hand segment 26g of the controller. Contactors 23 and 24 close in response to energization and complete energizing circuits for the operating coils of brakes 65 and 66 thereby releasing these brakes. Simultaneously energizing circuits are completed for contactors 41 and 44 which circuits are traced from the power segments 26b through segment 26g and conductor 75, "nearly closed" limit switch 53, operating coils of contactors 41 and 44 in parallel and thence by conductor 64 and switch 58 to the middle supply line 20. Contactors 41 and 44 close and apply single phase power to the synchronizing motors 36 and 37. Since contactors 41 and 44 reverse the connections between the source and the synchronizing motors, it is clear that when the third phases of these motors are closed by contactors 42 and 46 that the direction of rotation of the magnetic field will also be reversed which of course is necessary since the direction of the driving motor has been reversed. Thereafter, the driving motors 13 and 14 are energized and brought up to speed in a manner that is identical with that previously described for the hoisting operation and will not be repeated.

As the span 10 approaches its seating position "nearly closed" limit switch 53 is operated to its open position and contactors 41 and 44 are de-energized and opened, thus removing power from the synchronizing motors and allowing the driving motors to seat each end of the span individually. As the span approaches its fully seated position, limit switches 54 and 55 are operated to their open position, as a result of which reversing contactors 23 and 24 are opened and power is removed from the driving motors 13, 14. The operator then moves the controller 26 to its off position, thereby restoring the apparatus to its initial condition.

In the event that one of the driving motors becomes disabled its associated synchronizing motor is operated as a driving motor. For example, assume that the driving motor 13 is disabled, making it necessary to utilize the synchronizing motor 36 as a driving motor. The manually operated switches 47 and 48 are operated to their right-hand position. The switch 47 in its right-hand position partially completes connections from the synchronizing motor 36 to the power source 20 and prevents the application of power from the source to the driving motor 13. Similarly, switch 48 in its right-hand position interrupts the connection 38 between the rotor circuits of the synchronizing motors, disconnects the resistance sections 27 and 28 from the secondary circuit of the driving motor 13 and connects the resistance sections to the rotor circuit of the synchronizing motor 36. The motor 36 when energized will now operate as a driving motor, because the primary on the synchronizing motor 36 has its phases suitably reversed in switch 47 to give driving motor action. It is clear, however, that there will be no synchronizing power exchanged between the motors 36 and 37 and consequently if the speed of the motors 36 and 14 are not equal the span 10 will become out of level. This would cause the span 10 to jam in the guides of the operating towers 11 and 12 and would prevent further movement of the span.

In order to prevent this undesirable condition an electrical motion transmitting device 76 is arranged on the drive shaft of the motor 13 and a similar electrical motion transmitting device 67 is arranged on the drive shaft of motor 14. The stator windings of the transmitter 76 are connected to the stator windings of an electrical differential device 78 whilst the stator windings of the transformer 77 are connected to the rotor windings of the differential device. The rotor windings of the transmitters 76 and 77 are single phase windings and are supplied with single phase power from the source 20 to which they are connected as illustrated. The stator windings of the transmitters 76 and 77 are physically similar to distributed three-phase windings. Both rotor and stator windings of the differential device are also physically similar to distributed polyphase windings. Currents in the rotor windings of the transmitters 76 and 77 induce voltages in their respective stator windings and these voltages are respectively applied to the stator and rotor windings of the differential device 78. When the rotors of the transmitters 76 and 77 are in electrical correspondence the voltages applied to the differential device are equal and opposite with the result that there is no tendency for the rotor of the differential device to rotate, and consequently the contact member 78a mounted on the rotor shaft of this device remains in the central upright position in which it is illustrated. However, if the rotors of the transmitters 76 and 77 become out of correspondence with each other, the voltages applied to the differential device become unbalanced and the contact member 78a is rotated in a direction that is dependent upon the direction in which the rotors of the transmitters have become out of correspondence.

To place the electrical motion transmitting system 76, 77, 78 in operation, the switch 80 is first operated to its open position.

On the first three points of the controller the hoisting operation is similar to that already described with the single exception that the synchronizing motor 36 acts as a driving motor and hence the previous description of this operation need not be repeated. When the controller 26 is operated to its fourth position, energizing circuits are established for the operating coils of contactors 30 and 34 which circuits are traced from the power segment 26b, segment 26r, cooperating stationary finger, conductor 81, contact 78a, contact 78c, and 78b in parallel, conductors 82 and 83 in parallel, contacts 23a and 23b (in the lower closed position) conductors 84 and 85 in parallel, operating coils of contactors 30 and 34 in parallel and thence by conductors 70 and 64 and 58 to the middle supply line 20. Contactors 30 and 34 close in response to their energization and exclude resistance section 27 from the circuit of motor 37 and resistance section 32 from the circuit of motor 14. If the right-hand end of the span 10 should rise more rapidly than the left-hand end, the contact member 78a is rotated in a counter-clockwise direction out of engagement with the stationary contact member 78b thereby interrupting the energizing circuit for the operating coil of contactor 34. The latter opens in response to de-energization of its operating coil and inserts the resistance section 32 in the rotor circuit of the motor 14 so that the speed of this motor is decreased with the result that the left-hand end of the span is brought into level with the right-hand end. When the span is again level the contact member 78a reengages the contact member 78b to recomplete the energizing circuit from the operating coil of contactor 34 thereby causing the contactor to close and again exclude the resistance section 32 from the motor circuit.

In a similar manner, if the left-hand end of the span 10 becomes higher than the right-hand end the contactor member 78a is rotated in a clockwise direction out of engagement with the contact member 78c thereby interrupting the energizing circuit of the operating coil of contactor 30 which opens and inserts the resistance section 27 in the circuit of motor 36. As a result, the speed of the motor 36 decreases to afford the right-hand end of the span an opportunity to become level with the left-hand end. When this condition obtains the contact member 78a is again rotated to its central position in which it reestablishes energizing circuits for the contactor 30, causing the latter to close and again exclude the resistance section 27 from the motor circuit.

If the right-hand end of the span 10 becomes higher than the left-hand end during the hoisting operation, the speed of the motor 14 must be decreased. However, if the right-hand end is higher than the left-hand end during the lowering operation it is clear that the speed of the motor 14 must be increased. The differential device 78 is unable to distinguish between the raising and lowering operations since when the right-hand extremity of the span 10 is high the contact member 78a is always rotated in the counterclockwise direction whilst when the left-hand end is high the contact member 78a is rotated in the clockwise direction. Thus, the differential device 78 tends to make the same correction irrespective of the direction of travel of the span. For the purpose of reversing the connections between the contacts 78b and 78c and the operating coils of contactors 30 and 34, the main driving motor reversing contactor 23 is provided with an auxiliary set of stationary reversing contacts in circuit with conductors 82 and 83 leading to the stationary contacts 78b and 78c of the differential switch. Thus, when the span 10 is traveling in the upward direction the connections from the contacts 78b and 78c to the operating coils of the accelerating contactors 30 and 34 are as already traced. However, when the span is traveling in the lowering direction the reversing contactor 23 is operated to its upper closed position and auxiliary contact 23a connects 78b in the energizing circuit of accelerating contactor 70 whilst auxiliary contact 23b connects contacts 78c in the energizing circuit of accelerating contactor 34. Now, if the right-hand end of the span 10 becomes higher than the left-hand end, i. e., the left-hand end becomes advanced with respect to the right-hand end, the contact member 78a is rotated in a counter-clockwise direction, as before, out of engagement with the stationary contact member 78b thereby interrupting the energizing circuit of contactor 30 which opens to insert resistance sections 27 in the circuit of motor 36 thereby decreasing the speed of the latter and affording an opportunity for the right-hand end of the span to catch up with the left-hand end. Similarly if the left-hand end of the span 10 is high with respect to the right-hand end the contact member 78a is rotated in a clockwise direction out of engagement with the stationary contact member 78c, thereby deenergizing the accelerating contactor 34 which opens to insert resistance section 32 in the circuit of motor 14. As a result the speed of the motor 14 is decreased providing an opportunity for the left-hand end of the span to catch up with the right-hand end.

If the span should become out of level more than a predetermined permissible amount the contact 78d is rotated out of engagement with its cooperating stationary contacts so that it interrupts the energizing circuit for the operating coil of undervoltage relay 62. As a result of its deenergization, this relay descends to its lower open position in which it is illustrated, thereby disconnecting the power segment 26b of the controller from the source 20. This of course interrupts all the control circuits previously traced from the power segment and as a result the apparatus is all deenergized and returned to the initial inactive position in which it is illustrated. The brakes 65 and 66 are set and the system cannot be restarted until the bridge span 10 is releveled.

It can be seen also that the synchronizing motor 37 can be connected as a driving motor by the operation of switches 50 and 51 to the left-hand position, and provide emergency operation.

A further feature of this invention is to provide emergency operation of the bridge by operating one of the synchronizing motors, for example 36, as a driving motor in case of disablement of motor 13, without the necessity of operating the switches 47 and 48. In this case, the entire power for operating the bridge must be supplied by the remaining normal driving motor 14. The synchronizing motor 37 in this case acts as a generator and sends current through lines 38 to motor 36 which in turn lifts the left end of the bridge. This is possible because motor 13 being out of service, provides no rotating motion to the synchronizing motor 36. Therefore, when power is applied to motor 14 and it begins to rotate, motor 36 must also rotate in synchronism with 37 unless the torque requirements are in excess of the synchronizing motor ratings. In view of the fact that motors 36 and 37 cannot produce torque of themselves without their rotors being angularly displaced, the remaining driving motor must carry 200% load during the emergency condition to lift both ends of the bridge.

This emergency operation can be obtained remotely by merely opening switch 60 to disable the left side of the bridge, or switch 61 to disable the right side. It can easily be seen that these switches prevent the operation of contactors 19 and 21 which normally apply power to motors 13 and 14 from the supply source 20. Sequence operation of the control devices is as described previously under normal operation with the exception that contactors 19 and 21 cannot close. Switch 80 is kept in the closed position during such operation to prevent dropping out contactors 30 and 34.

It should be noted that this motor and control system provides a number of emergency operating conditions to assure continuity of service to both overland and navigation traffic. Duplicate sets of control devices are provided in each bridge tower such that flexibility of operation can be obtained with the least number of heavy cable power circuits from the incoming power supply on one tower, to the other.

Although, in accordance with the provisions of the patent statutes, this invention is described as embodied in concrete form, it will be understood that the invention is not limited to the exact form of the apparatus and connections shown and described, which are merely illustrative, since alterations and modifications will readily suggest themselves to persons skilled in the art without departing from the true spirit of this invention or the scope of the annexed claims.

What I claim as new and desire to secure by Letters Patent of the United States, is:

1. A control system for providing synchronous operation of a plurality of devices, comprising a plurality of driving motors, a plurality of polyphase synchronizing motors each connected to a different driving motor, means for starting said driving motors, and means responsive to operation of said starting means for supplying single phase power to said synchronizing motors prior to energization of said driving motors.

2. A control system for providing synchronous operation of electric motors and the like comprising in combination a plurality of driving motors, a plurality of polyphase synchronizing motors connected to said driving motors, a device for starting said driving motors, and means responsive to operation of said starting device for supplying single phase power to lock said synchronizing motors in synchronism and for subsequently supplying polyphase power to said synchronizing motors.

3. A control system for a bridge span and the like comprising in combination a pair of driving motors connected to opposite ends of said span, a pair of polyphase synchronizing motors connected to said driving motors, a separate electromagnetically operated brake for each of said driving motors, a starting device for said driving motors, and means responsive to an operation of said starting device for releasing said brakes and supplying single phase power to said synchronizing motors.

4. A control system for providing synchronous operation of a plurality of driving means comprising in combination a pair of driving motors, a pair of polyphase synchronizing motors connected to said driving motors, means for starting said driving motors, means responsive to an operation of said starting means for supplying single phase power to said synchronizing motors and subsequently energizing said driving motors, means for supplying polyphase power to said synchronizing motors an interval of time after application of said single phase power, means for deenergizing said driving motors at a predetermined limit of operation, and means for deenergizing said synchronizing motors an interval of time after deenergization of said driving motors.

5. A control system for a movable bridge span and the like comprising a pair of driving motors each connected to an end of said span, a pair of polyphase synchronizing motors each connected to a respective driving motor, means for starting said driving motors, means responsive to an operation of said starting means for energizing said driving motors, to raise said span and for energizing said synchronizing motors with single phase power, interlocking control connections insuring the energization of said synchronizing motors with single phase power prior to the energization of said driving motors, a time element device for establishing polyphase power connections to said synchronizing motors an interval of time after single phase energization thereof, limit switch mechanism for deenergizing said driving motors and said synchronizing motors, and interlocking control connections insuring deenergization of said driving motors prior to deenergization of said synchronizing motors.

6. A control system for a bridge span and the like comprising a pair of driving motors connected to opposite ends of said span, a pair of synchronizing motors each connected to a respective driving motor, means for starting said driving motors, means responsive to an operation of said starting means for energizing said synchronizing motors and for energizing said driving motors to lower said span, and limit switch mechanism for deenergizing said synchronizing motors prior to seating of said bridge.

7. A control system for a bridge span and the like comprising a pair of driving motors connected to opposite ends of said span, a pair of synchronizing motors respectively connected to said driving motors, starting means for said driving motors, means responsive to an operation of said starting means for energizing said synchronizing motors and for energizing said driving motors to lower said span, and limit switch mechanism for deenergizing said synchronizing motors prior to seating said span and for separately deenergizing said driving motors to provide seating both ends of said span.

8. A control system for a bridge span and the like comprising a pair of driving motors connected to opposite ends of said span, a pair of synchronizing motors respectively connected to said driving motors, limit switch mechanism operable in the down direction of travel of said span for rendering said synchronizing motors inactive prior to seating said span and additional limit switch mechanism for separately deenergizing said driving motors to provide seating said ends selectively.

9. A control system for providing synchronous operation of a plurality of driving means comprising in combination a source of power, a pair of driving motors connected to said source, synchronizing means for said driving motors comprising a pair of alternating current motors respectively connected to said driving motors and having their secondary windings connected together and means for rendering a disabled driving motor inactive and for disconnecting said synchronizing motors from each other and connecting one of said synchronizing motors to said source thereby to render one of said synchronizing motors active as a driving motor.

10. A control system for providing synchronous operation of a plurality of driving means comprising in combination a pair of driving motors, accelerating resistances connected in circuit with each of said motors, synchronizing means comprising a pair of alternating current motors respectively coupled with said driving motors and connections between the secondary windings of said motors, means for rendering one of said driving motors inactive and means for rendering the associated synchronizing motor active comprising means for interrupting said connections and for connecting the resistance associated with said inactive driving motor in circuit with said active synchronzing motor.

11. A control system for providing synchronous operation of a plurality of electric motors and the like comprising in combination a pair of driving motors connected to a load operable in forward and reverse directions, accelerating resistances in circuit with each of said driving motors, synchronizing means comprising a pair of alternating current motors respectively coupled to said synchronizing motors and having their secondary windings connected together, means for rendering one of said driving motors inactive, and for rendering its associated synchronizing motor active as a driving motor, means for selectively deenergizing said driving motors, means for interrupting the connections between the secondary windings of said synchronizing motors and for connecting the accelerating resistance of the deenergized driving motor in circuit with its associated synchronizing motor to provide operation of the latter as a driving motor, means responsive to angular disagreement of said synchronizing motor and the active driving motor for controlling said resistances, and means dependent upon the direction of operation of said load for reversing the control of said resistances.

JOSEPH A. SETTER.